(12) United States Patent
Farooq et al.

(10) Patent No.: US 9,327,663 B2
(45) Date of Patent: May 3, 2016

(54) ADAPTIVE ENERGY ABSORBER FOR A VEHICLE

(71) Applicant: Ford Global Technologies, LLC, Dearborn, MI (US)

(72) Inventors: Iskander Farooq, Novi, MI (US); Mohammed Omar Faruque, Ann Arbor, MI (US); Sudip Sankar Bhattacharjee, Novi, MI (US); James Chih Cheng, Troy, MI (US); Srinivasan Sundararajan, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/458,506

(22) Filed: Aug. 13, 2014

(65) Prior Publication Data

US 2016/0046249 A1 Feb. 18, 2016

(51) Int. Cl.
*B60R 19/03* (2006.01)
*B60R 19/18* (2006.01)
*B60R 19/26* (2006.01)

(52) U.S. Cl.
CPC ........... *B60R 19/18* (2013.01); *B60R 2019/186* (2013.01); *B60R 2019/262* (2013.01)

(58) Field of Classification Search
CPC .............. B60R 19/18; B60R 2019/186; B60R 2019/262
See application file for complete search history.

(56) References Cited

U.S. PATENT DOCUMENTS

| | | |
|---|---|---|
| 6,893,064 B2 | 5/2005 | Santou |
| 7,597,383 B2 | 10/2009 | Itou et al. |
| 7,866,716 B2 | 1/2011 | Perucca et al. |
| 7,954,864 B2 | 6/2011 | Frederick et al. |
| 8,646,552 B2 | 2/2014 | Evans et al. |
| 2006/0131902 A1* | 6/2006 | Shimoda ................. B60R 19/18 293/121 |
| 2009/0200810 A1* | 8/2009 | Roussel .................. B60R 19/18 293/120 |
| 2013/0140850 A1 | 6/2013 | Tyan et al. |
| 2014/0062107 A1 | 3/2014 | Kim et al. |

* cited by examiner

*Primary Examiner* — Lori L Lyjak
(74) *Attorney, Agent, or Firm* — Frank A. MacKenzie; Bejin Bieneman PLC

(57) ABSTRACT

An energy absorption system comprises a vehicle bumper, an energy absorption member attached to the vehicle bumper, and a plurality of ribs having respective first ends that are hingedly attached to the energy absorption member. The ribs extend between the energy absorption member and the bumper. The ribs may be actuated based on the speed information from the onboard vehicle communication network.

20 Claims, 6 Drawing Sheets

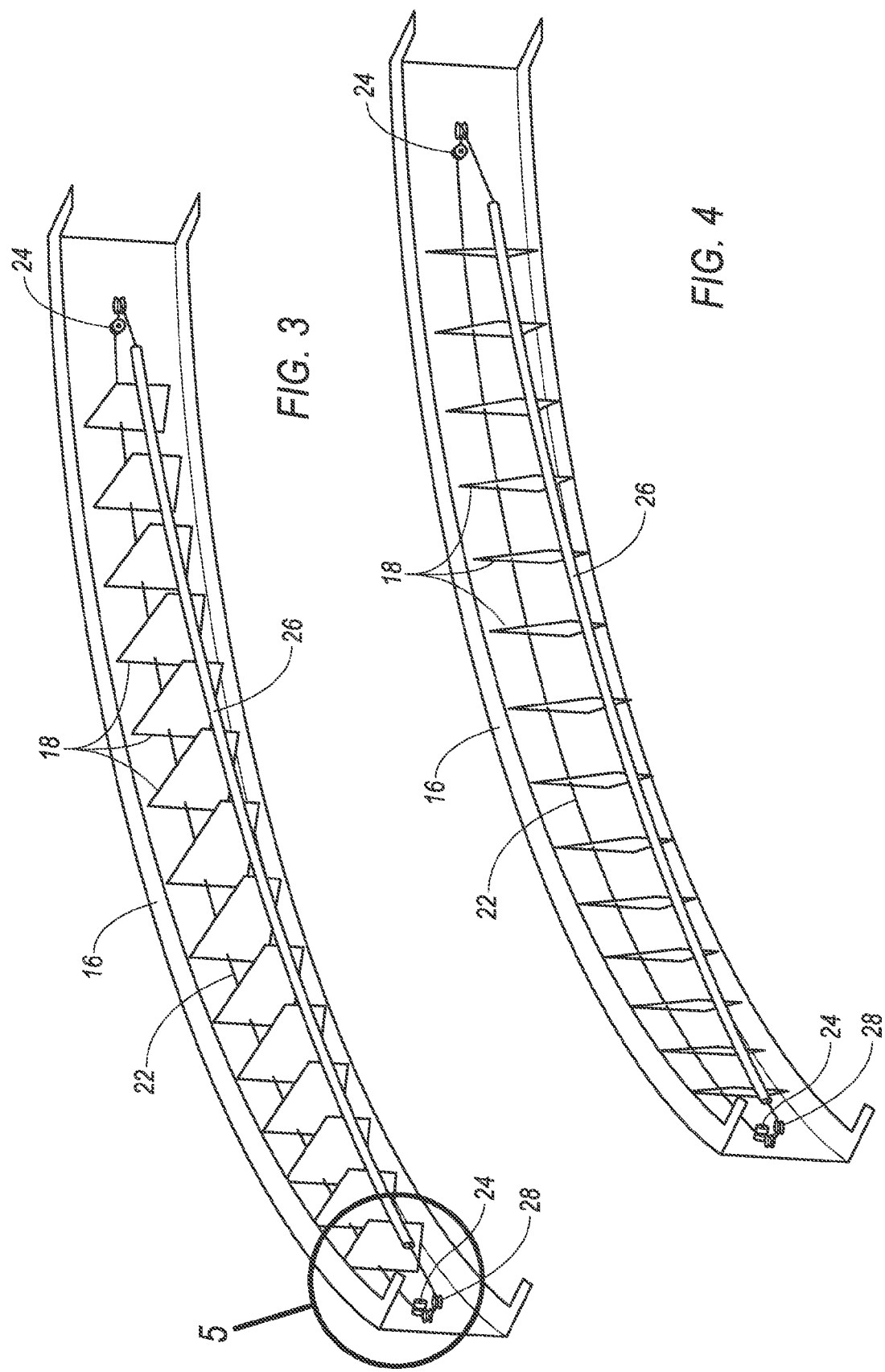

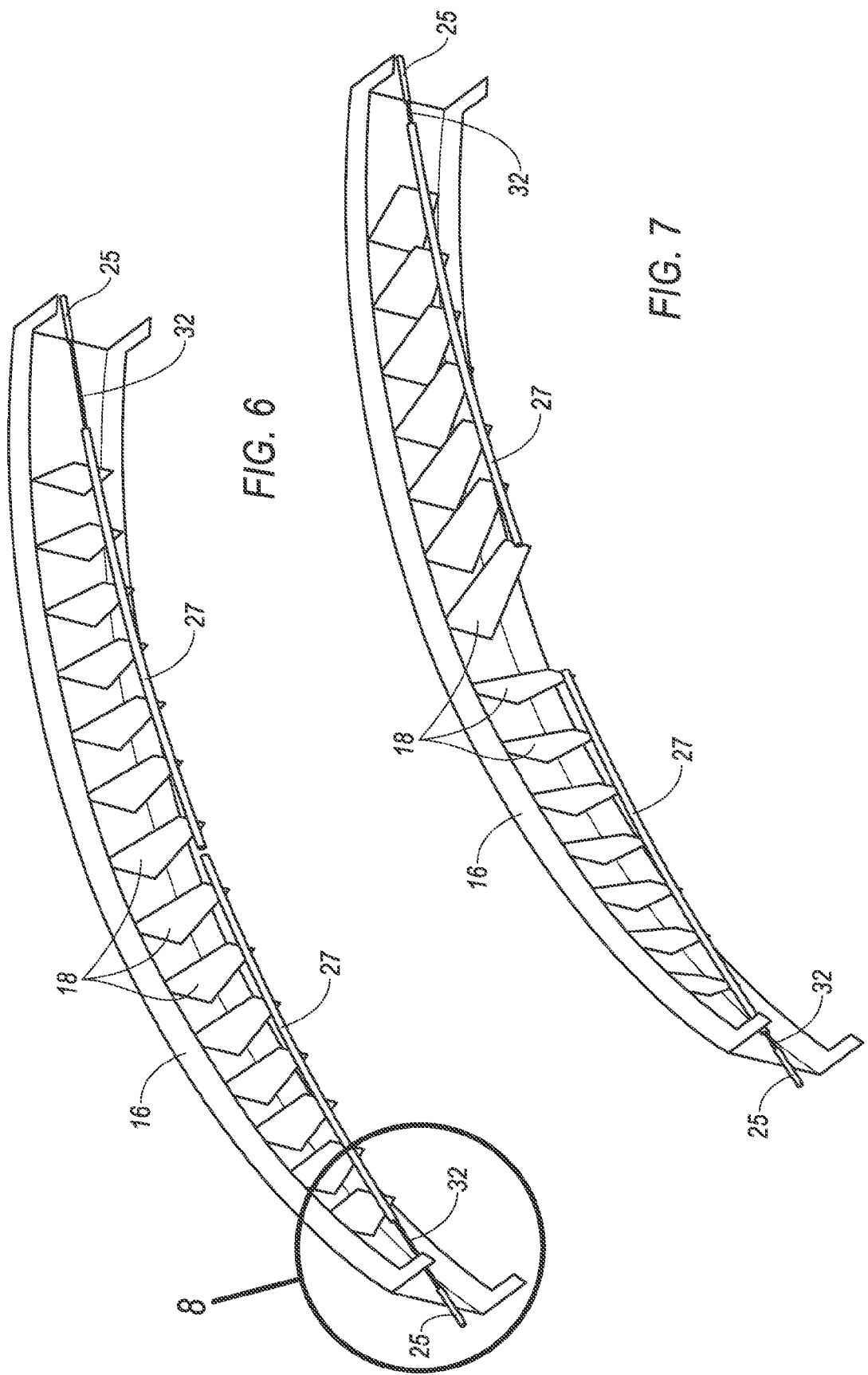

_US 9,327,663 B2_

ADAPTIVE ENERGY ABSORBER FOR A VEHICLE

BACKGROUND

Requirements for protecting a vehicle front end may conflict for different crash scenarios. For example, low-speed damageability (LSD) and pedestrian protection requirements may differ. LSD requirements generally dictate that no or minimal damage occurs to various vehicle front end components, e.g., side rails, radiator supports, doors, fenders, hood, hinges, headlamps, etc., at low speeds, e.g., speeds below 15 kilometers per hour (KPH). Accordingly, LSD scenarios generally require that approximately 80 percent of impact energy from a collision be absorbed by a vehicle bumper at speeds of 15 KPH or less. In contrast, pedestrian protection requirements are generally designed to limit pedestrian leg injuries to certain knee shear and bending moment targets at relatively higher speeds, e.g., around 40 kilometers per hour. Accordingly, relative to one another, LSD scenarios generally require a stiff bumper system, whereas pedestrian protection scenarios generally require a softer bumper mechanism. Unfortunately, current vehicle bumper systems are not adaptable to meet these different requirements. There is a need for a vehicle bumper system that can adapt to the respective requirements of an LSD scenario and a pedestrian protection scenario.

DRAWINGS

FIG. 3 is a perspective view of first example of the adaptive energy absorber system of FIG. 1, including an adaptive energy absorber and ribs deployed for a low-speed scenario.

FIG. 4 is a perspective view of first example of the adaptive energy absorber system of FIG. 1, including an adaptive energy absorber and ribs deployed for a higher speed, e.g., pedestrian protection, scenario.

FIG. 6 is a perspective view of a second example of an adaptive energy absorber including ribs deployed for a low speed scenario.

FIG. 7 is a perspective view of the second example of an adaptive energy absorber including ribs deployed for a higher speed, e.g., pedestrian protection, scenario.

DETAILED DESCRIPTION

Figure 1:
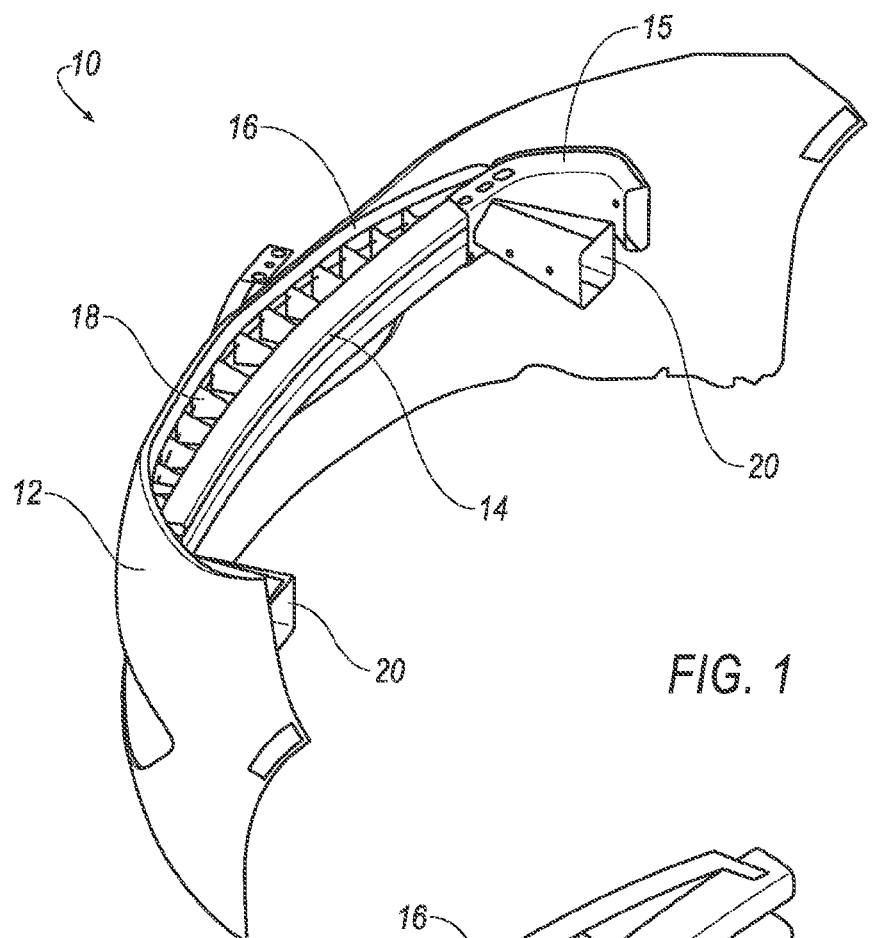
FIG. 1 is a perspective view of an adaptive energy absorber system.

Disclosed herein and illustrated in the various figures is an adaptive energy absorber system 10 for a vehicle. As seen, for example, in FIG. 1, a vehicle front fascia 12, which is shown for completeness and context, but which is not necessary to the energy absorber system 10, may cover a bumper 14 and an energy absorber 16 affixed to the bumper 14. The fascia 12 could be affixed to the energy absorber 16 with a low density foam or the like (not shown) to allow the fascia 12 to maintain a desired shape. The bumper 14 may be a conventional vehicle bumper, e.g., formed of steel or the like. The energy absorber 16 may be any one of a variety of materials, depending on energy absorption requirements, such as an elastomeric plastic, sheet metal, etc. The bumper 14 may further have affixed thereto side extensions 15, as well as side members, e.g., crash cans, 20. The bumper 14, e.g., the crash cans 20 and/or side extensions 15, may be attached to a vehicle front end (not shown) in a conventional manner.

Figure 2:
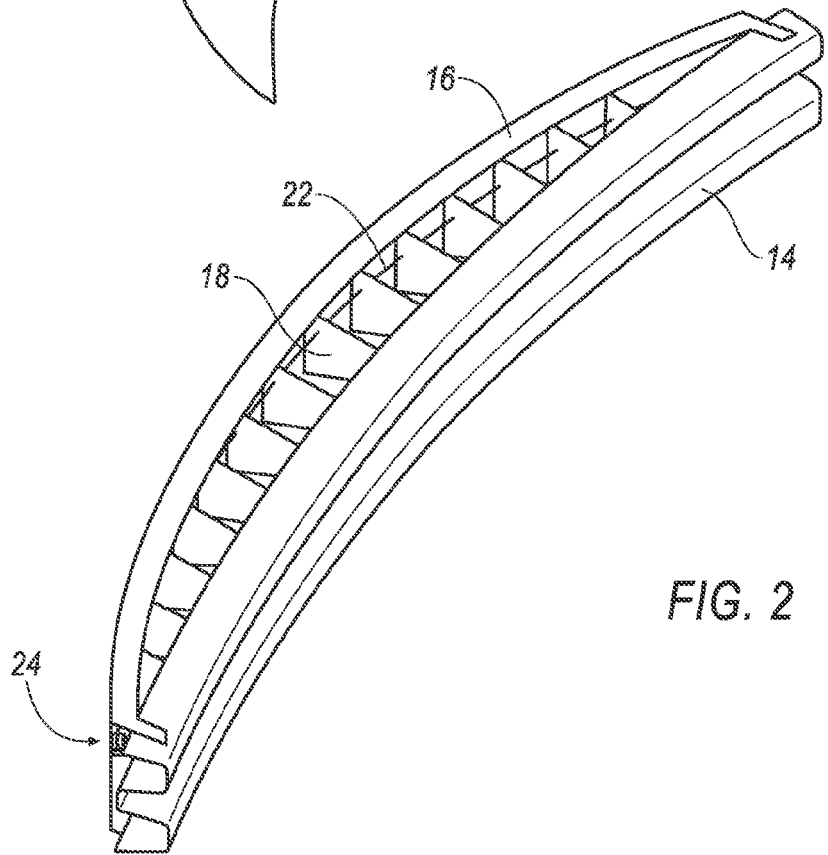
FIG. 2 is a perspective view of the adaptive energy absorber system of FIG. 1, with a vehicle front fascia and portion of the bumper removed.
Figure 5:
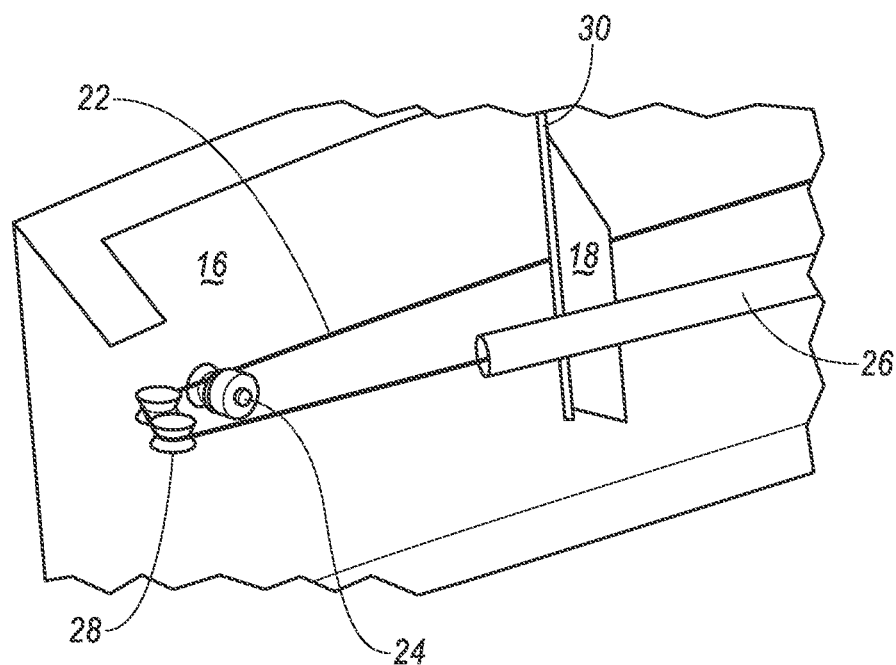
FIG. 5 is a detail view illustrating a pulley and guide installed on the adaptive energy absorber of FIG. 3.

As seen in both FIGS. 1 and 2, the energy absorber 16 may be offset from the bumper 14 by a plurality of ribs 18. The ribs 18 are generally formed of a plastic, and are hingedly attached at respective first ends to the energy absorber 16, e.g., each rib 18 may be connected to the energy absorber 16 by a plastic hinge 30 as illustrated in FIG. 5. Further, although shown with no holes or openings, the ribs 18 could be provided with such to reduce weight and material costs, so long as the hinges 30 are provided between the ribs 18 and the energy absorber 16, and so long as the ribs 18 have sufficient strength to move the energy absorber 16 as described herein. In any case, hinged movement of the ribs 18 in a longitudinal direction with respect to the bumper 14 and energy absorber 16, i.e., movement of second ends of the ribs 18 that are located distally with respect to the hinges 30, can be actuated as described herein to change energy absorption characteristics of the energy absorption system 10.

As best seen in FIGS. 3 and 4, a cable 22, e.g., formed of twisted wire or the like, may be threaded through an opening in the energy absorber 16, or, alternatively, through openings provided for the cable in each of the ribs 18. First and second ends of the cable 22 may be attached, e.g., via a known mechanism such as a clamp or the like, to respective first and second ends of the pull bar 26. The pull bar 26 is affixed to respective second ends of each of the ribs 18. For example, the pull bar 26 may be welded, glued, adhered, etc. to the second ends of the ribs 18. Alternatively, although not shown in the figures, note that, the pull bar could be segmented in two or more places, multiple pieces of the pull bar 26 being hingedly attached to one another.

Figure 9:
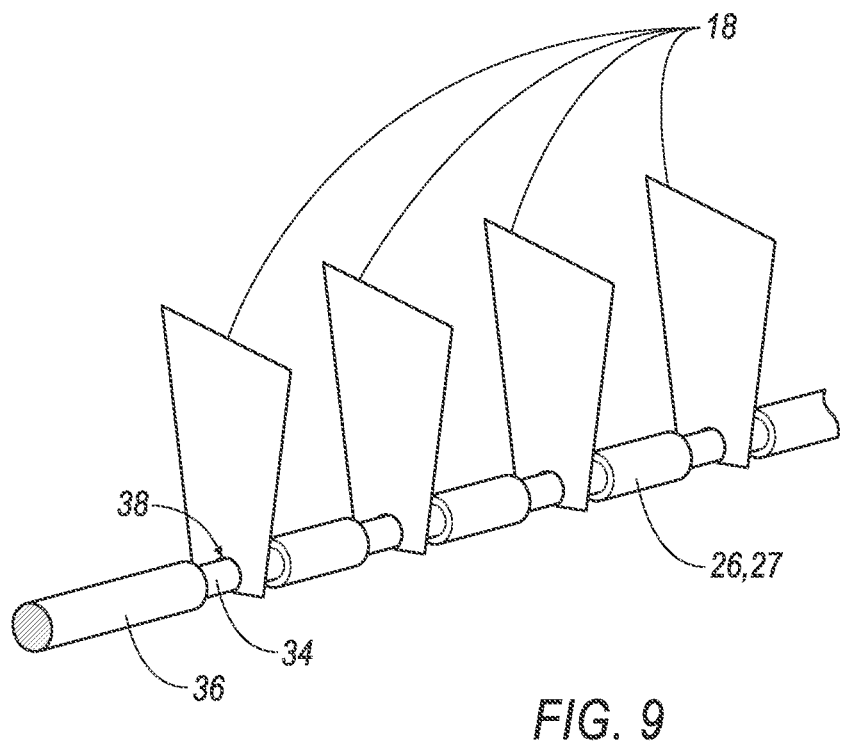
FIG. 9 is a perspective view of a portion of an adaptive energy absorber system illustrating an example of a connection between ribs and a pull rod.

Alternatively or additionally, slots could be provided in the second ends of the ribs 18 to receive the pull bar 26, which could be snapped into the slots and/or otherwise adhered or affixed. For example, as seen in FIG. 9, a plastic or metal pull rod 26 or 27 may be provided with a substantially circular cross-sections according to first and second diameters of various portions 34, 36. For example, a first set of portions 34 of the a pull rod 26, 27 may have a reduced diameter compared to a second set of portions 36. Further, first and of each rib 18, i.e., an end that is attached to the pull rod 26 or 27, may include an opening 38. A size of the opening 38 may be according to a portion of a circle having a diameter equal to, or slightly smaller than, a diameter of the reduced portions 34 of the rod 26 or 27. Accordingly, the portions 34 may be snapped into place in the openings 38 of respective ribs 18, whereby friction will maintain the rod 26 or 27 in place with respect to each of the ribs 18, i.e., maintain a fixed attachment of the rod 26 or 27 to the ribs 18.

As best seen in FIG. 5, movement of the cable 22 may be caused by actuation of a motorized pulley 24, which may be affixed to the energy absorber 16, e.g., using a screw, a bolt, etc. Further, one or more cable guides 28 may be provided to guide the cable 22 in a loop encompassing the opening in the energy absorber 16 and the opening in the pull bar 26. For example, as seen in FIGS. 3 and 4, cable guides 28 may be provided at respective ends of the energy absorber 16. Accordingly, actuating the motorized pulley to move the cable 22 thus results in longitudinal movement of the second ends of the ribs 18 with respect to the bumper 14 and energy absorber 16, i.e., actuating the motorized pulley 24 to move the cable 22 results in changing a respective angle of each of the ribs 18 with respect to the energy absorber 16. A specific angle or angles of the ribs 18 achieved by actuation of the pulley 24 may vary in various implementations and depends on materials used in various components of the system 10, e.g., the energy absorber 16, a shape of such components, as well as desired energy absorption characteristics of the system 10. Actuation of the motorized pulley 24 is discussed further below with respect to FIG. 10.

Figure 8:
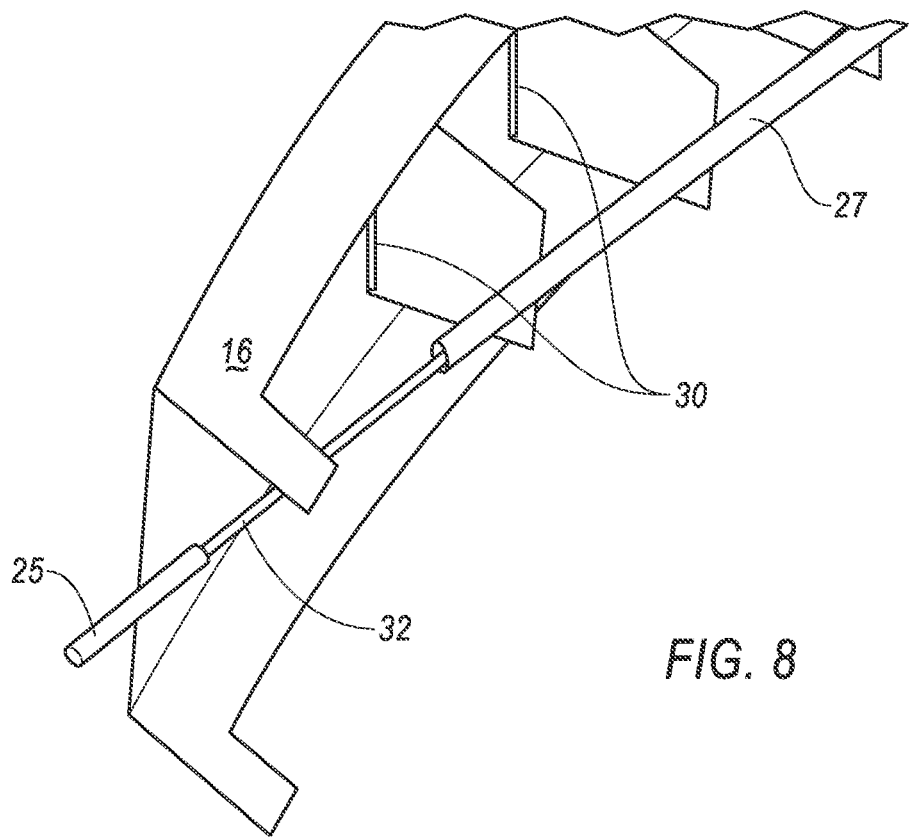
FIG. 8 is a detailed view illustrating a linear actuator installed on the adaptive energy absorber of FIGS. 5 and 6.

FIGS. 6-8 illustrate aspects of a second example of an adaptive energy absorber system 10. In this second example, instead of a single pull bar 26, the system 10 includes first and second pull bars 27. Each of the pull bars 27 is generally affixed, e.g., in a manner described above with respect to the pull bar 26, to respective second ends of some but not all of the ribs 18 that are hingedly attached to the energy absorber 16. The pull bars 27 are generally not attached to a same rib 18, i.e., are generally attached to completely different sets of the ribs 18. For example, a first pull bar 27 may be attached to substantially half of the ribs 18, and a second pull bar 27 may be attached to substantially half of the ribs 18.

Outer ends of each pull bar 27 are attached to respective link rods 32, that are in turn attached to respective mechanisms to affect linear movement of the respective pull bars 27, linear actuators 25. An "outer end" of a pull bar 27 means a first end of the pull bar 27 that is proximate to an end of the energy absorber 16, i.e., closer to an end of the energy absorber 16 than a second end of the pull bar 27. The linear actuators 25 are mounted on or at respective ends of the energy absorber 16 in a known manner, e.g., via screws, bolts, etc. By moving the linear actuators 25 in a longitudinal direction with respect to the energy absorber 16 and the bumper 14, second ends of the ribs 18, i.e., ends not hingedly attached to the energy absorber 16, can also be moved in the longitudinal direction. That is, the second ends of the ribs 18 are moved when the pull bar 27 is pushed or pulled by a linear actuator 25 via a link rod 32. Accordingly, respective angles of first and second sets of ribs 18 with respect to the energy absorber 16 can be changed, thereby changing energy absorption characteristics of the system 10. Note that respective linear actuators 25 can move respective pull bars 27 in respective first and second longitudinal directions, e.g., toward respective first and second ends of the energy absorber 16 as illustrated by FIG. 7. Further, other mechanisms could be used instead of the linear actuators 25, e.g., a solenoid mechanism.

FIG. 6 shows the ribs 18 deployed for a scenario such as an LSD scenario in which greater stiffness of the bumper system 10 is required, i.e., the bumper system 10 should be configured to absorb a greater amount of energy, leaving less energy to be absorbed by other components in a vehicle. Accordingly, FIG. 7, in contrast, shows the ribs 18 deployed for scenario such as a pedestrian protection scenario involving relatively higher vehicle speeds, in which the bumper system 10 should be configured to absorb less energy, thereby allowing more energy of an impact to be absorbed by other components in a vehicle. As can be seen in FIG. 6, the ribs 18 when deployed for the LSD scenario may be substantially perpendicular to the energy absorber 16, or to a tangent at a longitudinal center of the energy absorber 16 where the energy absorber 16 is longitudinally curvilinear. In FIG. 7, on the other hand, the ribs 18, e.g., when deployed for a pedestrian protection scenario, are angled with respect to the energy absorber 16 or tangent thereof, e.g., by 10 degrees or some other angle to provide a desired energy absorption characteristic of the system 10.

Figure 10:
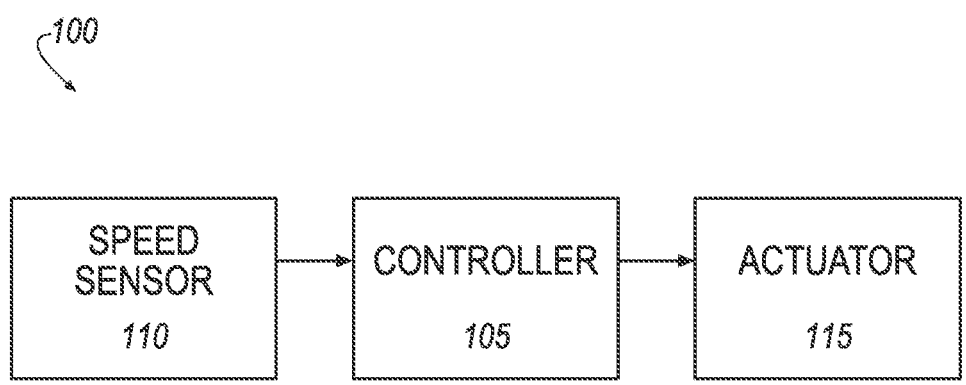
FIG. 10 is a block diagram of a vehicle bumper control system.

FIG. 10 is a block diagram of a vehicle bumper control system 100. The system 100 includes a controller 105 communicatively coupled to one or more actuators 115. The controller 105 generally includes a processor and a memory, the memory storing instructions executable by the processor. Further, the controller 105 may communicate on an in-vehicle network and/or communications mechanism, such as a controller area network (CAN) or the like. Accordingly, in addition to one or more actuators 115, the controller 105 may be communicatively coupled to one or more speed sensors 110. A speed sensor 110 may be any one of a number of known mechanisms for providing an indication of vehicle speed to the controller 105, e.g., as a CAN communication or the like. The actuator 115 shown in FIG. 9 is a generic representation of an actuator used to effect a change in an energy absorber system 10, e.g., one of the actuators 24, 25 discussed above.

A process executed according to instructions stored in the memory of the controller 105 could include a step of, when a vehicle is in motion, using data from one or more speed sensors 110 to determine whether to deploy the bumper system 10 according to a low-speed scenario or a high-speed scenario, e.g., an LSD scenario or a pedestrian protection scenario. For example, a low-speed scenario could be identified when a vehicle was traveling at a speed of 15 kilometers per hour or less, while a high-speed scenario could be identified for any higher speed than this. In any event, upon identifying a scenario, the controller 105 could send a signal, e.g., a CAN communication, to an actuator or actuators 115 to move ribs 18 to achieve a desired energy absorbing characteristic of the system 10. Accordingly, in the event of an impact, the system 10 would provide appropriate energy absorbing characteristics for a speed of impact.

As used herein, the adverb "substantially" modifying an adjective means that a shape, structure, measurement, etc. may deviate from an exact described geometry, distance, measurement, etc., because of imperfections in materials, machining, manufacturing, etc.

In the drawings, the same reference numbers indicate the same elements. Further, some or all of these elements could be changed. Accordingly, it is to be understood that the above description is intended to be illustrative and not restrictive.

Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meaning as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. An energy absorption system, comprising:
    a vehicle bumper;

an energy absorption member attached to the vehicle bumper; and a plurality of ribs having respective first ends that are hingedly attached to the energy absorption member; wherein the ribs extend between the energy absorption member and the bumper.

2. The system of claim 1, further comprising at least one pull bar fixedly attached to respective second ends of the ribs.

3. The system of claim 2, further comprising a cable, wherein the cable is threaded through one of an opening in the energy absorption member and openings in the ribs, and further wherein first and second ends of the cable are attached to first and second ends of the at least one pull bar, respectively.

4. The system of claim 3, further comprising a motorized pulley, wherein the cable is moved when the pulley is actuated such that the pull bar is moved, thereby moving the second ends of the ribs.

5. The system of claim 2, wherein each of the second ends of the ribs is provided with an opening to accommodate the at least one pull bar.

6. The system of claim 5, wherein the at least one pull bar includes a plurality of first portions having a first diameter, and a plurality of portions having a second diameter that is reduced with respect to the first diameter, and further wherein the second diameter is equal to or larger than a diameter of the opening in each of the second ends of the ribs.

7. The system of claim 2, wherein the at least one pull bar is two pull bars.

8. The system of claim 7, further comprising a first mechanism for linear movement of a first one of the pull bars, and a second mechanism for linear movement of a second one of the pull bars.

9. The system of claim 8, further comprising first and second link rods, the first link rod connecting the first mechanism with the first pull bar, and the second link rod connecting the second mechanism with the second pull bar.

10. The system of claim 8, wherein at least one of the first mechanism and the second mechanism includes one of a linear actuator and a solenoid.

11. The system of claim 2, further comprising a controller that includes a processor and a memory, the memory storing instructions executable by the processor, the instructions including instructions to determine a vehicle speed and, based on the vehicle speed, send a signal to actuate movement of the at least one pull bar to effect an angle of the ribs with respect to the energy absorber to achieve a desired energy absorption characteristic.

12. The system of claim 1, wherein the system is installed in a vehicle.

13. An energy absorption system, comprising:
a vehicle bumper;
an energy absorption member attached to the vehicle bumper;
a plurality of ribs having respective first ends that are hingedly attached to the energy absorption member, wherein the ribs extend between the energy absorption member and the bumper;
a pull bar that is fixedly attached to respective second ends of the ribs; and
a cable that attached to the pull bar such that movement of the cable moves the pull bar in a longitudinal direction with respect to the energy absorption member, whereupon an angle of the ribs with respect to the energy absorption member changes.

14. The system of claim 13, further comprising a cable and a motorized pulley;
wherein the cable is threaded through one of an opening in the energy absorption member and openings in the ribs, and further wherein first and second ends of the cable are attached to first and second ends of the at least one pull bar, respectively; and
further wherein the cable is moved when the pulley is actuated such that the pull bar is moved, thereby moving the second ends of the ribs.

15. The system of claim 14, wherein each of the second ends of the ribs is provided with an opening to accommodate the pull bar, and the pull bar includes a plurality of first portions having a first diameter, and a plurality of portions having a second diameter that is reduced with respect to the first diameter, and further wherein the second diameter is equal to or larger than a diameter of the opening in each of the second ends of the ribs.

16. The system of claim 14, further comprising a controller that includes a processor and a memory, the memory storing instructions executable by the processor, the instructions including instructions to determine a vehicle speed and, based on the vehicle speed, send a signal to actuate movement of the pull bar to effect an angle of the ribs with respect to the energy absorber to achieve a desired energy absorption characteristic.

17. An energy absorption system, comprising:
a vehicle bumper;
an energy absorption member attached to the vehicle bumper;
a plurality of ribs having respective first ends that are hingedly attached to the energy absorption member, wherein the ribs extend between the energy absorption member and the bumper;
first and second pull bars; wherein the first pull bar is fixedly attached to a first set of the ribs and the second pull bar is fixedly attached to a second set of the ribs; and
a first mechanism for linear movement of a first one of the pull bars, and a second mechanism for linear movement of a second one of the pull bars.

18. The system of claim 17, further comprising first and second link rods, the first link rod connecting the first mechanism with the first pull bar, and the second link rod connecting the second mechanism with the second pull bar.

19. The system of claim 17, wherein at least one of the first mechanism and the second mechanism includes one of a linear actuator and a solenoid.

20. The system of claim 17, further comprising a controller that includes a processor and a memory, the memory storing instructions executable by the processor, the instructions including instructions to determine a vehicle speed and, based on the vehicle speed, send a signal to actuate movement of the at least one pull bar to effect an angle of the ribs with respect to the energy absorber to achieve a desired energy absorption characteristic.

* * * * *